Oct. 10, 1961 — T. A. INSOLIO — 3,003,242
GLASS CUTTING MACHINE
Filed Feb. 7, 1957 — 5 Sheets-Sheet 2

INVENTOR.
Thomas A. Insolio
BY
Webb, Mackey & Burden
HIS ATTORNEYS

Oct. 10, 1961 T. A. INSOLIO 3,003,242
GLASS CUTTING MACHINE
Filed Feb. 7, 1957 5 Sheets-Sheet 3

INVENTOR.
Thomas A. Insolio
BY Webb, Mackey & Burden
HIS ATTORNEYS

Oct. 10, 1961 T. A. INSOLIO 3,003,242
GLASS CUTTING MACHINE
Filed Feb. 7, 1957 5 Sheets-Sheet 4
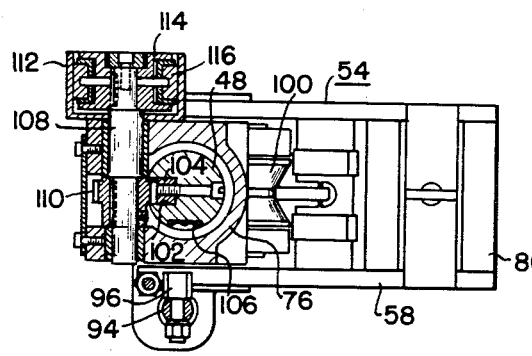
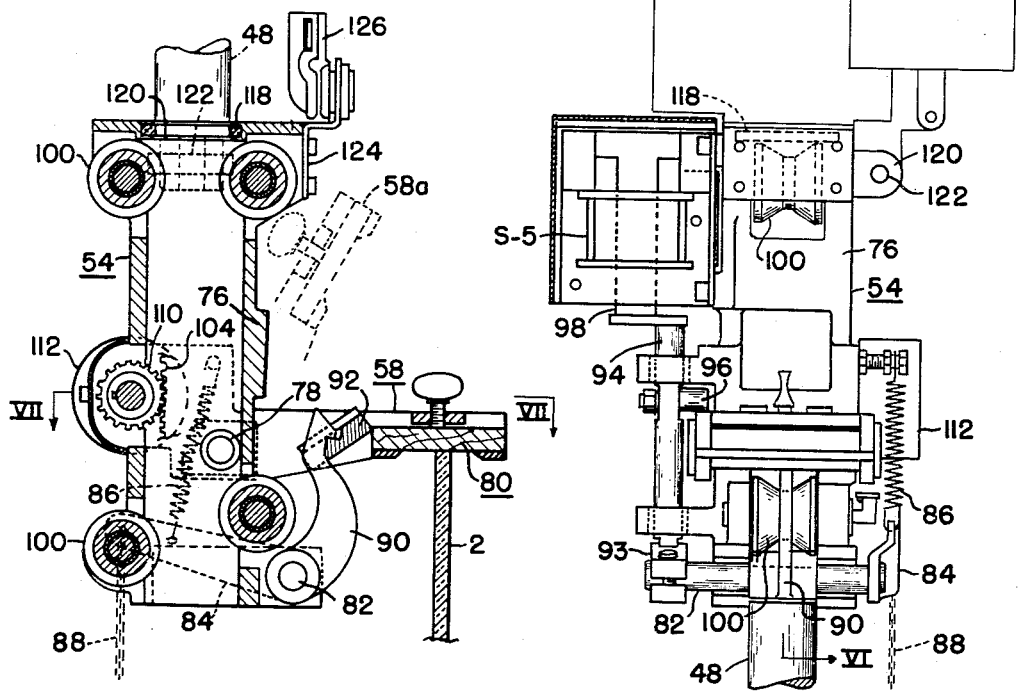
INVENTOR.
Thomas A. Insolio
BY
Webb, Mackey & Burden
HIS ATTORNEYS Oct. 10, 1961

T. A. INSOLIO 3,003,242

GLASS CUTTING MACHINE

Filed Feb. 7, 1957

INVENTOR.
Thomas A. Insolio
BY Webb, Mackey & Burden
HIS ATTORNEYS

United States Patent Office 3,003,242
Patented Oct. 10, 1961

3,003,242
GLASS CUTTING MACHINE
Thomas A. Insolio, Jeannette, Pa., assignor to American Window Glass, Pittsburgh, Pa., a corporation of Pennsylvania
Filed Feb. 7, 1957, Ser. No. 638,836
27 Claims. (Cl. 33—32)

The present application relates to a glass cutting machine, more particularly a machine for performing what is commonly termed the capping operation on a rising sheet of glass, consisting of periodically making a cut thereon transverse to its direction of movement at successively measured points along the length. Each cut will produce a separate rectangular sheet of glass which is broken away from the parent sheet immediately following that cut.

A machine provided in accordance with this invention is of the type generally as shown in Klages Patent No. 2,650,430. Briefly, glass cutting machines of this general type include a cutter cage or carriage adapted for vertical movement alongside a rising sheet of glass, a cutter traveling horizontally on that cage so as to move transversely across the glass sheet, and measuring post structure which is carried by the cage and which includes a laterally pivoting capping head on the post to contact the advancing edge of the sheet. The cage is raised by chains connected to it and passing over sprockets on a cage shaft provided adjacent the top of the machine. That cage lift shaft is driven from a set of a conveyor rolls which move the glass sheet upwardly. In use, the cage which carries the transversely traveling cutter moves for a period at the same speed as the rising glass sheet to eliminate relative shift of the cutter legnthwise on the glass in order that the cut made during that period is exactly at right angles to the direction of movement of the sheet.

At the present time it is the practice to provide a lost motion connection enabling limited movement between the measuring post structure and the cage to throw a switch, or in the alternative, reliance is placed on directly throwing the switch from the advancing edge of the glass sheet, and in either case one or more of these switches serve to actuate a drive clutch provided on the cage lift shaft so as to drive it from the conveyor roll and also to actuate a cutter cycle at the proper time. That switching action is caused by or is timed to substantially coincide with the rather abrupt engagement between the glass and the remote end of the measuring post which, at its base end, is either rigid with the cutter cage or is capable of the just described limited movement relative thereto. The result is that the measuring post withdraws the weight of the carriage from the cage lift shaft by transferring and placing that full load thereof on the edge of the freely upstanding end of the sheet just preliminary to the cut. Solid contact with the edge of the sheet is a necessity and actually under this practice there is a problem to be sure of contact being made at all. Because of their unsupported lengths, glass sheets of the larger capping sizes tend to lean and sway as the glass rises, thereby missing engagement altogether with the contacting part on the measuring post. Therefore, in practice there can be no assurance of solidly made contact at all times or consistent contact at all, particularly for the larger cappings.

The invention according to this application materially compensates for the foregoing deviations of the rising sheet by providing a traveling capping head structure on the measuring post which descends thereon through a full travel to meet the edge of the uprising sheet and which uniformly and solidly seats itself so as to accompany the sheet during upward progress which totals up to eight or ten feet of travel, for example, or more before being broken off in the larger capping sizes. More specifically, this measuring post provides a capping head structure traveling in a manner to move foot for foot with the full length of the sheet to be cut except for the initial two feet of travel of the latter, thereby accurately tracking with the larger capping sizes of glass up to 80% or more of its measured travel beyond the cutter. This particular capping head structure includes a stop element locked to the post and a shiftable capping head element cooperating therewith with automatically timed action to apply and to release the weight of these post structure elements and the cage from the glass, to temporarily hold the head element suspended from the stop element in a poised position on the post preventing the contact edge of the head from scraping the edge of the glass, and to trip the head from its poised position for traveling the length of the post under gravity and thus promptly encounter and travel with the freshly oncoming glass passing beside the cutter and the base of the post. The stop element is adjustable and can be placed on the post at any position selected beyond which it prevents any further relative movement between the traveling capping head and the post.

In a broader sense a feature of this invention is the interrelationship provided in the timing between the operation of the capping head structure and the operation of further cycles of the capping machine wherein the glass is cut and wherein the cut sheet is broken away. These latter cycles follow in succession only after the edge of the rising sheet has gradually completed three separate stages in undertaking to carry the entire weight of the cutter structure, namely, setting the counterweighted traveling head initially in motion alone, secondly lifting the counterweighted measuring post therewith as permitted by its loose connection with the cage therebelow, and finally lifting the cage too, when the slack is removed in the loose connection with the post to make it solid.

Further features, objects and advantages will either be specifically pointed out or become apparent when for a better understanding of the invention reference is made to the following written description taken in conjunction with the accompanying drawings which show a preferred embodiment of the invention and in which:

FIGURE 5 shows the traveling capping head in front elevation taken in the direction of the arrows V—V of FIGURE 4;

FIGURE 6 is a sectional view of the capping head in side elevation taken along the lines VI—VI of FIGURE 5;

FIGURE 7 is a transverse section in plan taken along the section lines VII—VII of FIGURE 6;

Figure 1:
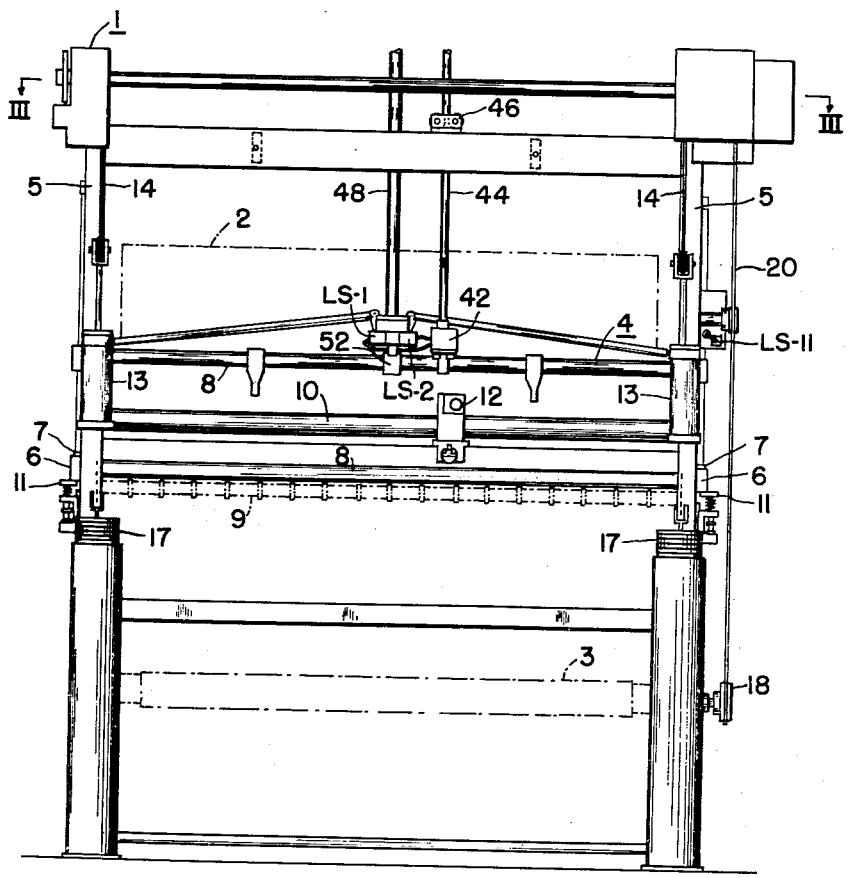
FIGURE 1 is a front elevation view of the present machine with a portion of the showing of FIGURE 2 removed.
Figure 13:
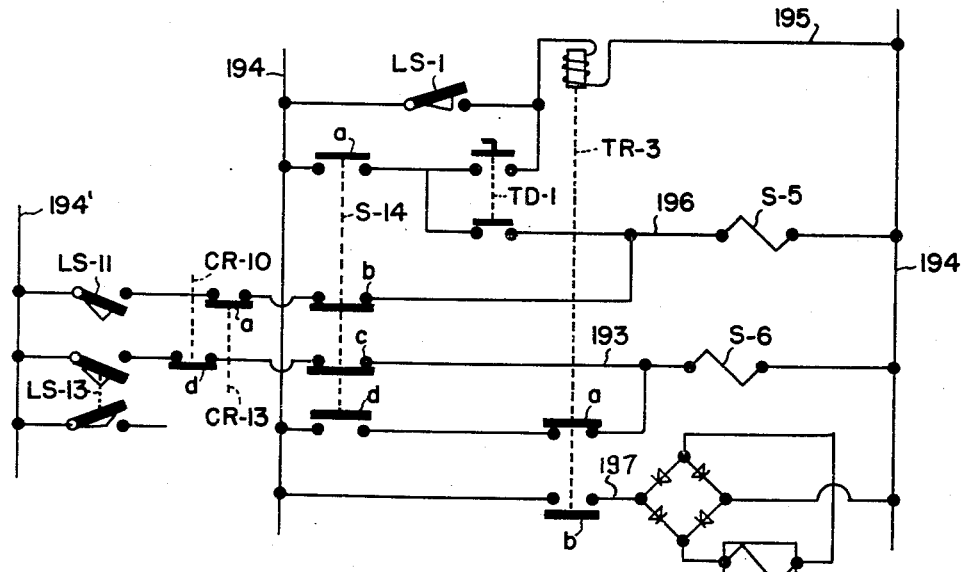
Figure 11:
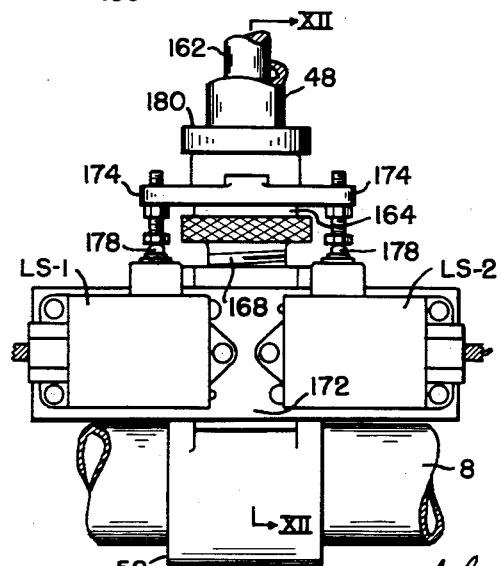
Figure 12:
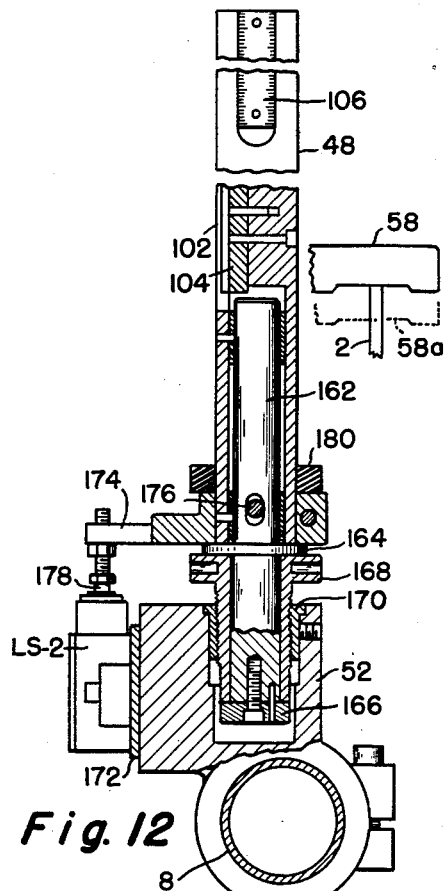

FIGURE 11 corresponds to FIGURE 1 showing the upper center portion of the cage forming the cutter carriage to enlarged scale;

FIGURE 12 is a section in side elevation taken along the lines XII—XII of FIGURE 11; and FIGURE 13 is a wiring diagram of an automatic control circuit in the machine.

More particularly in the drawings a glass cutting machine 1 embodying this invention provides a path for a glass sheet 2 which is moved upwardly therein in a vertical direction by means of a set of conveying rolls 3 of a Fourcault machine and which is to be capped through automatic measuring and scoring operations transversely of the direction of movement of the glass sheet 2. A carriage 4 forming a cutter cage is guided for vertical movement between a fixed pair of spaced side frames 5 in the machine 1. The carriage 4 comprises two end brackets 6 each having vertically spaced ball bushings 7 which are lined on the inside with the usual small hard steel balls, not shown, and which therefore freely ride on guide rods fixed in a vertical disposition on the side frames 5. The carriage 4 has a pair of upper and lower tubular members 8 transversely supported in the machine 1 with their ends in the brackets 6 and a transversely extending breaking tube 9 which is bracket mounted to the end bracket 6 in a downwardly and forwardly offset position from the lower tubular member 8. The carriage 4 also has a monorail 10 primarily tubular in cross section which extends transversely of the machine 1 and is supported at its ends in the end brackets 6. The monorail 10 carries a cutter carrying trolley 12 which shifts thereon transversely across the sheet 2 as the carriage 4 moves upwardly.

Figure 2:
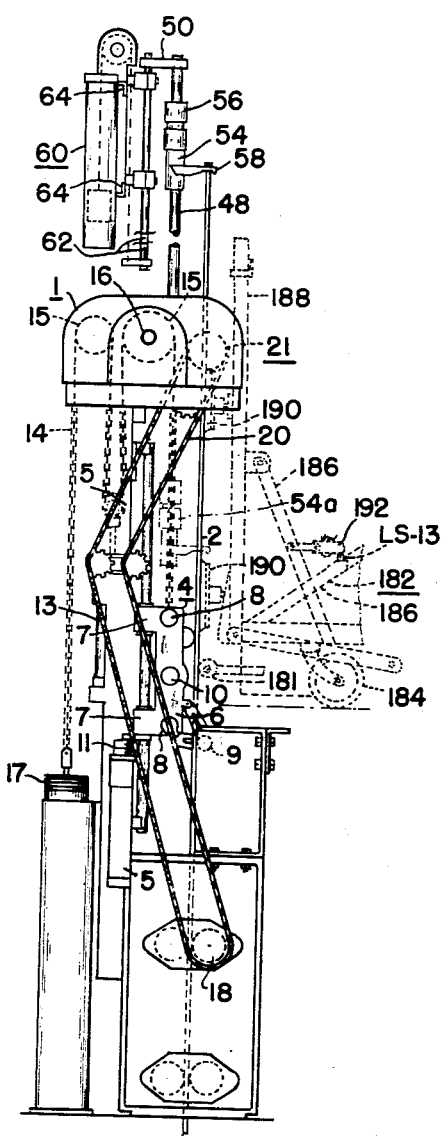
FIGURE 2 is a side elevational view with the lower portion of FIGURE 1 removed.

As shown in FIGURES 1 and 2 the carriage 4 descends through its noncutting stroke in the machine 1 to a lower limit of travel at which the end brackets 6 engage a pair of spring bumpers 11 fixed to the side frames 5 of the latter. Two cage lift chains 14 have a loop in the center which is kept under tension by means of the sprocket of a counter force cylinder 13 which is kept internally charged with compressed air and the two vertical flights forming that loop in each chain 14 pass around respective sprockets 15 which are located by pairs at spaced points on the top of the machine 1 and one pair of which is secured to a cage lift shaft 16 extending transversely of the machine. The chains 14 are connected at one end to the brackets 6 forming part of the carriage 4 and at the other end they carry a counterweight 17 which substantially balances the weight of the carriage 4. When the lift shaft 16 is driven in the proper direction, the sprockets 15 and the chain 14 passing therearound move so as to raise the carriage 4.

The lift shaft 16 is driven in the following manner to raise the carriage 4. The roll shafts 3 are driven by the main drive motor, not shown, in the Fourcault machine and one of these roll shafts 3 has a shaft extension. The shaft extension carries a sprocket 18 which is connected through an endless chain 20 to a drive sprocket 21 at the head of the machine 1. The drive sprocket 21 according to FIGURE 3 and the inner part of an overrunning clutch 22 are fast to a common shaft 24 and the outer part of the overrunning clutch 22 carries a drive pinion 26. One pair of the sprockets 15 is fast to a companion idler shaft 28 disposed parallel to the carriage lift shaft 16 which in addition to carrying the other pair of sprockets 15, carries a magnetic clutch 30 having the usual slip ring contacts 32 for electrically energizing the same. In conventional way an annular clutch drum 34 is pulled to the right when the clutch 30 is magnetically energized so as to frictionally engage two sets of stacked clutch plates against a fixed backing plate 36, the different sets of the clutch plates being fast respectively to the backing plate 36 and to an annular plate carrier 38 which rotates freely on the shaft 16. The plate carrier 38 also carries a gear 40 which is bolted thereto and which is in continual mesh with the pinion 26. The mechanical ratio from the roll shaft 3 to the carriage lift shaft 16 is such that the carriage 4 travels at a slightly slower rate that the periphery of the glass conveying rolls 3. The overrunning clutch 22 makes it possible, however, for the carriage 4 to be lifted faster than it would be by the mechanical drive even though the magnetic clutch 30 is engaged.

In FIGURE 1 the cutter carriage 4 carries an electrical junction box 42 which is affixed to the upper tubular member 8 for movement therewith and by means of which the carriage supports a tubular metal conduit 44 containing electrical control wires and riding in a pair of rollers 46 fixed to the frame of the machine 1 so as to guide the conduit 44 vertically. The upper tubular member 8 centrally thereof carries an upstanding measuring post 48 disposed parallel to the conduit 44 in the carriage assembly and having an upper support bracket 50 fast to the head thereof and a lower support bracket 52 at the base which is rigidly clamped to the upper tubular member 8 in the carriage 4.

A traveling head 54 (FIGURE 2) forms one of the elements of a capping head structure which is mounted to the measuring post 48 between its ends and which further includes an adjustable stop element 56. The traveling head 54 runs down the measuring post 48 to the lower limited position shown by the dotted lines 54a in FIGURE 2 and it carries a glass contacting paddle 58 which in this lower limited position engages the upwardly rising edge of the sheet of glass 2 to lift the capping head 54 therewith upwardly. A post guide assembly 60 which carries the upper support bracket 50 at the head of the measuring post 48 has a depending frame of tubular support members 62 rigidly affixed to the frame of the machine 1 and the assembly 60 is particularly seen in FIGURE 4.

Figure 4:
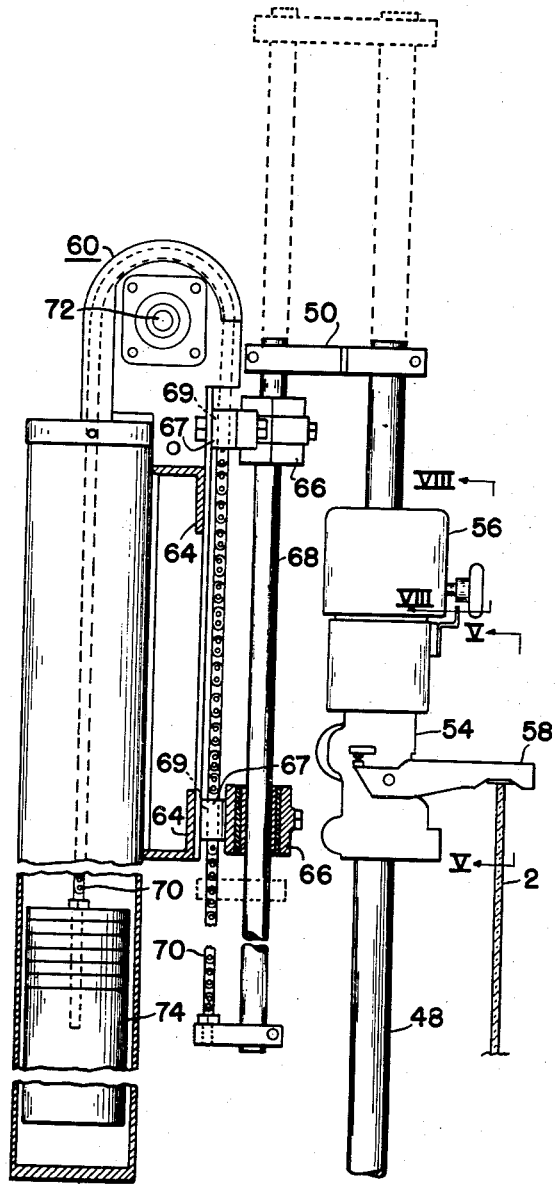
FIGURE 4 is a view corresponding to FIGURE 2 showing the upper portion thereof to enlarged scale and partially broken away for clarity.

A pair of vertically spaced frame cross members 64 of L-iron shape in cross section is welded to the support members 62 in the guide assembly 60 and these members have mounting structures which carry an offset, vertically aligned pair of stationary ball bushings 66 lined with the usual small steel balls seen in FIGURE 4. The mounting structures for the respective ball bushings 66 include a pair of spacer pads 67 which are welded at spaced apart points to a common plate across the cross members to define therewith a chain guide opening 69. A guide rod 68 rigidly secured through the support bracket 50 to the measuring post 48 is coaxially received in the bushings 66 so to run up and down so as to guide the post 48. A chain 70 which is secured at one end to a bracket fast to the bottom of the rod 68 passes over a sprocket carried on a fixed shaft 72 at the head of the frame of the assembly 60 and the chain 70 is secured at the other end to a counterweight 74 which substantially balances the weight of the post 48. In one physically constructed embodiment of the invention the guide rod 68 was sufficiently longer than the span between the ball bushings 66 to give the measuring post 48 a vertical travel of approximately 30 inches.

The head 54 forming the traveling element of the capping head structure is shown in FIGURES 5, 6, and 7 to include a generally tubular case 76 having spaced trunnion bearings 78 at the midportion in which the glass contacting paddle 58 pivots about the usual trunnion connections into its withdrawn position shown by the dotted lines 58a in FIGURE 6. A hardwood paddle block 80 clamped within the framework of the paddle 58 by means of a thumb screw directly engages the upper edge of the rising glass sheet 2. A cross shaft 82 journaled in the bottom of the case 76 has a lever 84 fast to one end thereof which is biased upwardly by a latch return spring 86. A flexible latch pull 88 made of chain depends from the lever 84 for use in manually rocking the cross shaft 82 which centrally thereof carries a latch plate 90 having a lug at the outer end engageable with a spring latching action against a striker plate 92 carried by the paddle 58.

At the other end thereof the cross shaft 82 carries a rearwardly extending lever 93 which at the free rear end thereof is aligned with and has a pin and slot connection to a slidably mounted vertical plunger rod 94 carrying a laterally protruding button 96. When the plunger rod 94 slides downwardly it carries the button 96 into engagement with the rear end of the paddle 58 so that simultaneously with unlatching the paddle latch plate 90 the rod 94 physically pivots the paddle into its withdrawn position. The head 54 carries an electric latch actuator 98 at the side of the case 76 having a vertically shifting armature in alignment with the plunger rod 94 and further having a latch release solenoid S–5 which energizes to magnetically force the armature against the plunger rod 94 so as to unlatch the paddle and pivotally withdraw it. The spring 86 causes the paddle 58 to relatch in place as soon as it is allowed to fall by gravity into its laterally pivoted position.

The capping head 54 carries pairs of opposed hourglass-shaped rollers 100 at the top and at the bottom of the case 76 for rolling in a common vertical plane along the measuring post 48. The measuring post 48 is relieved at one side in this vertical plane with a first lengthwise extending slot 102 containing a rack 104 which is bolted in the bottom of the slot. Another shallower slot at right angles to the first slot 102 in the post 48 contains a fixed measuring rule 106 which is pinned to the bottom thereof and which is used as a built-in convenience for setting the capping size of the glass sheets. An idler shaft 108, set crosswise to the tubular case 76 so as to rotate in fixed bearings thereon provided, carries a rack pinion 110 constantly meshing with the rack teeth of the rack 104 to provide a cog drive to the idler shaft which extends at one end into a fixed brake drum 112. The drum 112 further contains a brake shoe holder 114 which is fast to the extension of shaft 108 and which carries a set of brake shoe segments 116 mounted in conventional way to expand under the centrifugal force of rotation to press their metal wear surfaces into frictional contact with the inside of the brake drum 112. The shaft 108 therefore spins at a geared rate proportional to the travel of the capping head 54 linearly along the cog drive whereas the braking restraint on this shaft increases according to an exponential power of the speed in known manner with centrifugally acting brakes.

At the head of its tubular case 76, the head 54 carries a guide washer 118 fitting slightly loosely on the post 48 and also a latch striker bracket portion 120 which is on the same side thereof as the brake drum 112 and which carries a fixed striker pin 122. The head of the capping head case 76 further carries one or more mounting brackets 124 to which an electrical cable squeeze connector 126 and the end of a counterweight chain, not shown, are secured. The counterweight chain carries a freely moving counterweight, not shown, which functions in the expected manner to substantially balance the weight of the head 54.

Figure 9:
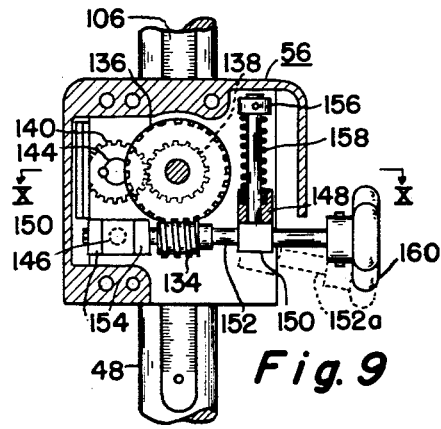
FIGURE 9 is a section in side elevation taken along the lines IX—IX of FIGURE 8.
Figure 8:
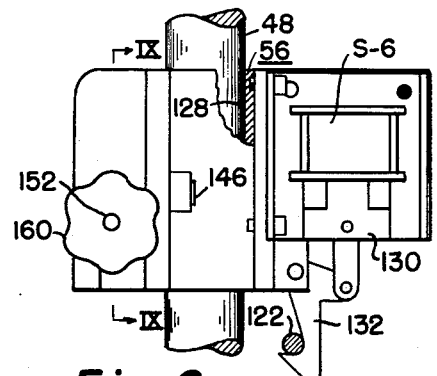
FIGURE 8 shows the head stop in front elevation taken in the direction of the arrows VIII—VIII of FIGURE 4.
Figure 10:
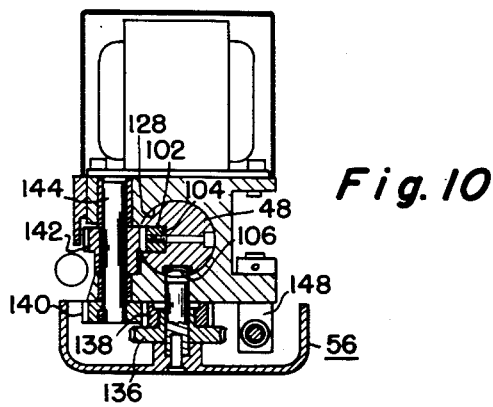
FIGURE 10 is a transverse section in top plan taken along the lines X—X of FIGURE 9.

The stop element 56 in the capping head assembly according to FIGURES 8, 9, and 10, is formed with a central cylindrical bore 128 presenting a bearing surface that slides on the post 48. The stop element 56 carries an electric latch actuator 130 containing a latch release solenoid S–6. When energized, the solenoid S–6 moves a lift link upwardly which is pivoted to a bell crank shaped latch plate or a quick-release connection 132 to pivot it outwardly to a withdrawn position from the cooperating fixed pin portion 122 carried by the latch striker bracket on the capping head 54. Otherwise, the latch plate portion 132 has a spring latch action to automatically engage the pin 122 and the weight of these parts is sufficient to provide the desired action without the actual need of a spring which can, therefore, be omitted. The stop element 56 is adjustable on the post 48, containing an adjusting gear train which in the path from its input to output members consists of a pair of worm and worm wheel members 134 and 136, a pair of intermediate meshing gears 138, 140, and a rack pinion 142 establishing a cog drive with the fixed rack 104 on the post 48. The gear 140 in the intermediate gears and the rack pinion 142 are fast to a common cross shaft 144 journaled to rotate on a fixed axis in the stop element 56 and the worm wheel 136 is mounted on a parallel shaft and rigidly carries the other intermediate gear 138.

In FIGURE 9 a set of three bearing blocks 146, 148, and 150 mount a cross shaft 152 carrying the worm 134 for two-way freedom of movement relative to the head stop element 56. The bearing block 146 has a trunnion portion which extends at right angles to the bearing opening through that block and which is anchored to turn on a fixed axis in the stop element 56. The inner end of the cross shaft 152 is journaled in the bearing opening in the block 146 and carries a pair of spaced retainer collars 154 to anchor it in the block from the opposite sides. The block 148 has a trunnion portion which extends at right angles to the slide bearing opening formed in the block and which is anchored to turn on a fixed axis relative to the stop element 56. The block 150 has a bearing opening which fits the cross shaft 152 and further has a trunion portion at right angles thereto which carries a stop collar 156 at the outer end and which slides in the slide bearing opening in the block 148 in a manner to tilt the latter. A coil return spring 158 surrounding the trunnion portion of the block 150 has one end engaging the block 148 and has the opposite end engaging the stop collar 156 for biasing the shaft 152 so as to pivot the teeth of the worm 134 thereon into mesh with the worm wheel 136. A hand knob 160 pinned to the outer end of the shaft 152 serves as a common means to rotate the shaft for driving the adjusting gear train or to pivot the shaft downwardly into the dotted line position 152a so as to separate the worm and wheel 134, 136 forming the input members of the train so as to disengage the latter for freely running movement of the stop element 56 along the cog drive. Thus when the worm and wheel 134, 136 are unmeshed the shaft 144 freely spins enabling the stop element 56 to be moved by hand to a coarse approximation of the position desired along the rule 106 whereupon the return spring 158 reengages the worm and wheel to enable a precise setting to be made by gearing. The stop element 56 carries a fixed pointer, not shown, registering with the rule 106 and in one physically constructed embodiment of the invention, the ratio of the adjusting gear train was such that one revolution of the hand knob 160 caused 0.130″ vertical movement of the stop element 56. Whenever the worm 134 is at rest and in mesh with the worm wheel 136, the gear train and the stop element on the cog drive will be locked against movement.

The support bracket 52 at the base of the measuring post 48 is adapted to provide a lost motion connection thereto according to FIGURES 11 and 12. For this purpose the bracket 52 carries an upstanding stud 162 and the post 48 has a hollow end which contains spaced sleeve bearings fitting on the stud and which rests at the extremity of the hollow end on a transverse retainer flange 164 integral with the midportion of the stud. The retainer flange 164 cooperates with a retainer plate 166 which is bolted to the lower end of the stud to hold a measuring post adjusting screw 168 at a fixed point on the length of the stud 162. The screw 168 threads into a bushing 170 fixed by a set screw in the mouth of a socket in the support bracket 52 and relative rotation of the screw 168 on the measuring post 48 causes it to shift upwardly and downwardly in the fixed bushing 170.

A pair of limit switches LS–1 and LS–2 have a common mounting plate 172 bolted to the support bracket 52. A split collar clamped to the bottom extremity of the measuring post 48 carries a pair of laterally protruding arm portions 174 which are vertically aligned with the respective switches LS-1 and LS-2 and the split collar is transversely aligned with but unconnected to a cross pin 176 rigid with the hollow end portion of the measuring post 48. The cross pin 176 fits in a vertically elongated transverse slot through the stud 162 effective to prevent the stud from turning and in the lowermost limiting position of the measuring post 48 it is preferred that the cross pin 176 never reaches the bottom of the slot. The arm portions 174 carry threaded adjustable contacts which in this lowermost position settle upon and press a switch push button 178 downwardly in each of the switches LS-1 and LS-2 so as to open their contacts. The contacts are spring urged to close in a conventional way when the push buttons 178 are released.

A collar of rubber forms a bumper 180 surrounding the base of the measuring post 48 above the split collar thereon and engages the underside of the traveling capping head 54 to limit the paddle 58 thereon to the lowest position thereof shown by the dotted lines 58a. It will be understood that when the advancing edge of the glass sheet 2 strikes the paddle 58 on the head so as to move it to the minimum capping position shown by the solid lines 58 in FIGURE 12 or to considerably higher positions depending on the pre-selected location of the stop element, the head 54 engages the stop which in turn causes the measuring post 48 to start to rise and carry with it the cross pin 176 which slides in the elongated slot in the stud 162 until such time as it engages the top of the slot so as to fully take up the lost motion. Thereafter the cross pin 176 establishes a solid connection with the slot whereby further lifting of the paddle 58 and the measuring post 48 causes lifting of the stud 162. The contact on the split clamp arm portions 174 are adjusted to make the switches LS-1 and LS-2 sensitive respectively to predetermined initial movement and to predetermined final movement in the lost motion connection and also to the collapsing movement thereof in the reverse direction to respectively close and to open the contacts, these contacts having electrical leads leading into the junction box 42 (FIGURE 1).

The cutter carrying trolley 12 in FIGURE 1 is timed to execute a two-stroke cycle of operation traveling first from right to left to score the glass sheet 2 for providing a break line and completing this cycle by moving back on a noncutting stroke. The scored line thereafter transfers upwardly with the moving sheet past the breaking tube 9 to a point opposite a break-off roller tube 181 fixed in the frame of a glass break-off machine 182 of the type generally as shown in the copending Insolio application Serial No. 518,731, filed June 29, 1955. The break-off machine 182 is more completely described in that application, but, briefly, it is portably mounted on a set of caster wheels 184 and the bed carries a double pivoted pair of crossed arms 186 which swingably support a vacuum frame 188 carrying a plurality of glass gripper cups 190. Under vacuum action these gripper cups grip the sheet of glass to bend it clockwise as viewed in FIGURE 2 about the break-off tube 181 as a center so as to snap the glass along a clean parting line delineated by the score of the cutter carried by the trolley 12.

The present machine comprises various switches for controlling the different operations above noted. The operation and function of these switches will be described briefly and thereafter a more detailed description of the sequential operation of the machine will be given.

Figure 3:
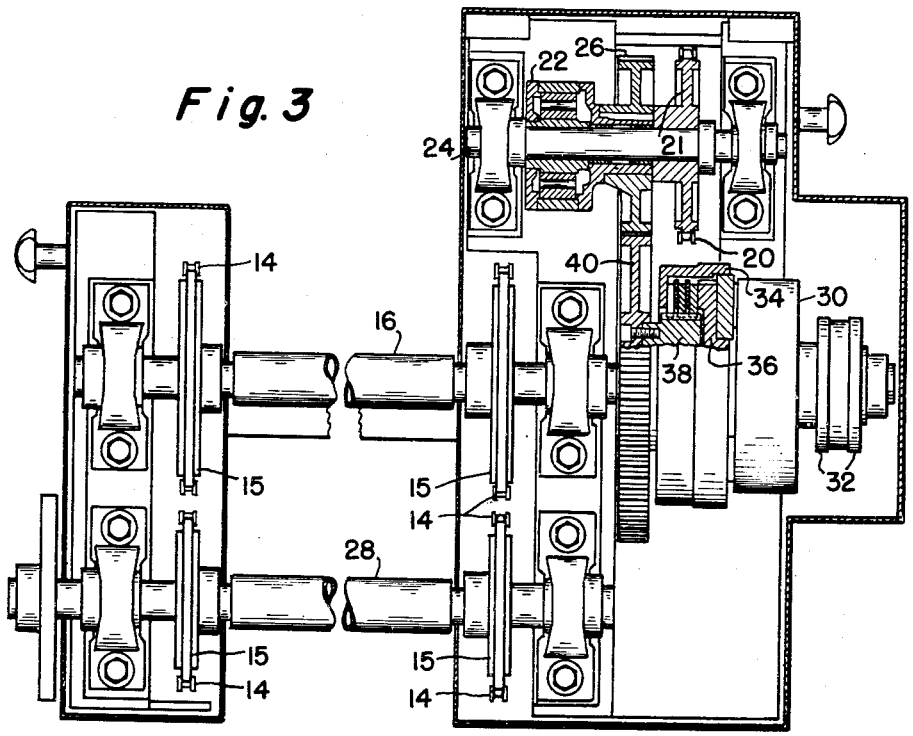
FIGURE 3 is an upper section in plan taken along the section lines III—III of FIGURE 1.

*Limit switch LS-1.*—This switch, previously noted, operates a time delay relay TR-3 (see FIGURE 13) which among other functions electrically operates the magnetic clutch 30 of FIGURE 3.

*Limit switch LS-2.*—This limit switch, already previously noted in connection with the companion switch LS-1, initiates the two-stroke cycle of operation of the cutter trolley 12 which is briefly referred to above and which is more fully set forth and claimed in the copending Insolio application Serial No. 518,731, filed June 29, 1955.

*Limit switch LS-11.*—This limit switch is mounted to one of the side frames 5 according to FIGURE 1 and is operated by the passing end bracket 6 on the upwardly rising cutter carriage 4. Its function is to energize the latch release solenoid S-5 so as to unlatch the paddle 58 and pivot it into the withdrawn position.

*Limit switch LS-13.*—This switch is mounted to the bed of the break-off machine 182 of FIGURE 2 and is operated by a cam 192 connected to the crossed arms 186 so as to be held closed when these crossed arms are rotated from the erected position shown into their laydown position. Its function is to energize the latch release solenoid S-6 for the capping head latch plate 132 of FIGURE 8 so as to trip the capping head when it is poised in its latched position.

*Treadle switch TD-1.*—The function of this treadle switch is to withdraw the paddle 58 from engagement with the edge of the glass sheet 2 and to keep the clutch 30 engaged in order that the carriage 4 continues to rise with the sheet whereby the glass may be broken away by hand if desired after it has been cut.

The following sequence of operation is carried out when it is desired that the capped glass sheet 2 is to be broken away by hand.

A two-position selector switch S-14 (FIGURE 13) is moved downwardly into its hand-break-off position thereby closing the lowest set of contacts *d* thereof to energize the lower branch of a circuit 193 between two energized conductors 194 and including the latch release solenoid S-6 for the capping head. The normally closed upper contact *a* of the time delay relay TR-3 enables current to flow in this lower branch thereby holding the latch plate 132 of FIGURE 8 in the released position. The upper contacts *a* of the selector switch S-14 prepare the switch TD-1 enabling it to ultimately operate a pair of circuits 195 and 196, one of which contains the time delay relay TR-3 and the other of which includes the latch release solenoid S-5 for the paddle 58 seen presently occupying the latch position desired and shown in solid lines in FIGURE 6. The glass sheet 2 rises vertically until the advancing edge strikes the paddle in its dotted line position 58a of FIGURE 12 and inasmuch as the weight of the traveling head 54 is countered as noted the head readily lifts with the sheet and starts to roll upwardly along the measuring post 48. After substantial travel upwardly along the post 48 the head 54 engages the stop element 56 in its path which is in an adjusted position fast to the post 48. The stop element 56 moves and, therefore, drags the post 48 along with the rising glass and the post can readily undertake this initial movement owing to the vertically guided and counterweighted arrangement thereof according to FIGURE 4. At this stage the measuring post 48 is actually lifting on the stud 162 according to FIGURE 12 whereas the stud affixed to the lower support bracket 52 has not yet started to move. The limit switches LS-1 and LS-2 close respectively as the stud 162 starts being carried upwardly by the cross pin 176 and as it reaches the top of the slot thereof. The first closing switch LS-1 energizes the time delay relay TR-3 in circuit 195 of FIGURE 13 thereby opening the upper contacts *a* of TR-3 to disable the release solenoid S-6 and latch the latch plate 132 so as to suspend therefrom the striker pin 122 carried by the capping head. A lower set of contacts *b* in the time delay relay TR-3 closes a rectifier circuit 197 which acts electrically to engage the magnetic clutch 30.

The carriage 4 begins to rise being driven by means of the conveyor rolls 3, the overrunning clutch 22, and the chain 14. By reason of the mechanical ratio previously noted the glass sheet 2 moves faster than the carriage 4 and the measuring post 48 continues to travel upwardly with relation to the stud 162. The limit switch LS-2 is adjusted as noted to operate slightly after the limit switch LS-1 so as to initiate the cycle of the cutter trolley 12 at the precise moment that the pin connection 176 with the slot becomes solidly engaged. This solid connection prevents further relative movement between the glass sheet and the carriage 4 and the rising sheet of glass takes on the load of raising the carriage which the clutch 22 permits by overrunning in the desired way. Thus the glass sheet is not required to give the initial extra lift to rapidly accelerate the carriage from rest, but nevertheless, when the sheet is about to be cut the full weight of the cutter carriage is taken by the sheet so as to insure an accurate cut.

Following that cut, which could have also been made by hand in lieu of using the automatic cutting cycle, the breaker takes hold of the scored sheet and places his foot on the treadle switch TD-1, FIGURE 13, thereby energizing the solenoid S-5 in the circuit 196 and also taking over control of energizing the energized time delay relay TR-3. Thus the time delay relay is forced to keep operating throughout the withdrawal of the paddle on the traveling capping head 54, thereby retaining the clutch 30 in operation and also keeping the capping head latched to the stop element 56 independently of the limit switch LS-1. As long as the breaker holds his foot on the treadle switch TD-1 the carriage will continue to rise upwardly owing to the enforced engagement of the overrunning clutch and the glass is broken away by hand completely free of its contact with the withdrawn paddle. The operator then removes his foot from the treadle switch TD-1 thereby deenergizing the solenoid S-5 in the circuit 196 to trip the capping head from its poised position for return to the base of the post 48. The time delay relay TR-3 immediately restores the latch release solenoid S-6 to its energized initial position and subsequently opens the rectifier circuit 197 containing the magnetic clutch 30 after a suitable time delay inherent in the delayed opening contacts b of the time delay relay TR-3. The paddle on the head 54 then resumes its latched position shown by the dotted lines 58a in FIGURE 12 to await the next rising sheet of glass 2.

The operation is then repeated.

The following sequence of operations is carried out in the glass capping operation performed in conjunction with the automatic break-off machine 182 of FIGURE 2.

The selector switch S-14 is moved to the upper position shown in solid lines in FIGURE 13 thereby closing the middle contacts b and c thereof to prepare for subsequent operation of an upper branch of the circuit 193 and also the circuit 196. Being unenergized in these two circuits in which they are included, the solenoids S-5 and S-6 enable the paddle 58 to remain latched in its laterally pivoted position and the latch plate 132 to remain in an operative position for automatically latching onto the capping head. In successive stages, the rising glass 2 first sets the capping head in motion therewith and subsequently starts the stop element and the measuring post 48 at which point the stop element and the capping head become engaged and immediately latch together. The limit switch LS-1 closes with initial movement of the lost motion connection and engages the clutch 30 in the manner previously indicated and ultimately the lost motion connection becomes solid as indicated causing the entire load of the carriage to be transferred to the sheet of glass and simultaneously the switch LS-2 closes and starts the cutter. On completion of the cutter cycle, the carriage 4 continues to move and reaches a point at which it closes the limit switch LS-11 (FIGURE 13) which conducts current from an energized conductor 194' through a set of relay contacts CR-13a which are closed for present purposes so as to energize the circuit 196 and withdraw the paddle so as to release the post from the glass by energizing the release solenoid S-5. The switch LS-1, therefore, trips open. The switch LS-11 has further contacts, not shown, for simultaneously initiating operation of the break-off machine 182 which is more fully described in the copending application Serial No. 518,731 already noted.

As the glass is thus broken away automatically, the circuit 193 stays deenergized to keep the capping head suspended in its poised position from the stop element 56 so as to prevent the paddle 58 from scraping along the edge of glass as a result of being inadvertently released at this point. Current flows through the limit switch LS-13 as soon as it closes, to energize the circuit 193 and accordingly trip the capping head latch so that it falls away from the stop element 56. When the crossed arms 186 of the break-off machine reach their lay-down position they close the limit switch LS-13 of FIGURES 2 and 13, but between the time that the glass starts toward its lay-down position and the time that the limit switch LS-13 senses this lay-down position and closes, the time delay contacts TR-3b automatically open as permitted by the now open switch LS-1, to release the clutch 30 and the cutter carriage 4 immediately drops to its initial position. The limit switch contacts LS-11 automatically reopen when the carriage drops to relatch the paddle 58 in its outwardly pivoted position and the switch LS-13 is reopened as soon as the crossed arms are restored to their solid line position of FIGURE 2 and for the present purposes a set of relay contacts CR-10d in circuit with the limit switch LS-13 can be considered closed at all times. Thus the solenoids S-5 and S-6 are restored to their unenergized state which they were noted to have at the outset of this automatic break-off operation.

The operation is then repeated.

It will be appreciated that the guide assembly 60 at the head of the measuring post 48 of FIGURE 4 not only guides the measuring post 48 vertically upwardly and downwardly, but holds it in a frontwardly offset position in the centrally located, common vertical plane of the counterweight 74, the guided chain 70, and the guide rod 68 so as to prevent the post 48 from twisting on its axis. It will be further noted that the periphery of the toothed pinion 110 of the traveling head 54 of FIGURE 7 and the periphery of the toothed pinion 142 on the adjustable stop element 56 of FIGURE 10 are straddled by and confined between the corners of the mouth of the common slot 102 in which they ride on the post 48, thereby keeping these two elements in the capping head structure from twisting relative to one another or to the shaft 48 as they move such that their respective latch portions 132 of FIGURE 8 and 120 of FIGURE 5 stay continuously vertically aligned. Moreover, the stud 162 of FIGURE 12 is also prevented from twisting because of its slotted engagement with the cross pin 176 which is rigid with the bottom end of the measuring post 48.

It will be apparent that in permissible capping sizes up to 8 to 10 feet for example, or longer, the paddle 58 will uniformly make contact with the glass sheet 2 and solidly settle into engagement with the edge thereof during their relatively long travel period together which consistently includes all but the first two feet of upward travel of the length of the sheet to be capped. The fact is to be further appreciated that release of the paddle from contact with the glass will always be preceded by engagement of the magnetic clutch and engagement of the latch plate 132 and that in both hand-break-off and automatic-break-off operations, there is a means provided for continuing both such engagements after release of the paddle. The clutch and the latch plate 132 are disengaged at roughly the same time following release of the paddle, the actual point of disengagement occurring approximately with, but after, the break-off operation.

Variations within the spirit and scope of the invention

I claim:

1. In sheet glass cutting apparatus, a frame, an assembly movable up and down in the frame comprising an upright measuring post for measuring the sheet to be cut and a horizontal carriage at the base of the post, cutter means on the carriage movable thereacross to cut the glass as measured, a capping head mounted to travel freely between points on the post and adapted to contact the advancing edge of the glass for moving at a like rate, means effective after substantial movement of said head which prevents further relative movement between the head and the measuring post so that said post undertakes guided movement at a like rate, and means operative after predetermined initial movement of said post which prevents further relative vertical movement between the post and the carriage whereby the carriage is lifted due to the force of the moving sheet of glass on the head.

2. In a machine for making a transverse cut across a vertically moving sheet of glass, an upright measuring post for measuring the sheet and arranged with a horizontal cutter carriage at the base thereof for making the transverse cut at a measured point, said measuring post and said cutter carriage being guided for vertical movement alongside said sheet, a capping head mounted to travel freely between points on the measuring post and movable from a withdrawn position to contact the advancing edge of said moving sheet for moving at a like rate, a stop having an adjusted position on the measuring post for engagement by the moving capping head to impart like motion to make it rise at the rate of the glass, means operative after predetermined initial movement of said post which prevents further relative vertical movement between the post and the carriage whereby the carriage is lifted farther due to the force of the moving sheet of glass on the head, and a latch portion on each of said stop and head and engageable when same are brought together to latch and retain the head temporarily upwardly suspended from the stop when the head is first withdrawn from the rising glass.

3. In a machine adapted to make a transverse cut at a measured point across a vertically moving sheet of glass, an upright measuring post for measuring the sheet and arranged in assembly with a horizontal cutter carriage at the base thereof, said measuring post and said cutter carriage being guided for vertical movement alongside said sheet, a capping head mounted to travel freely between points on the post and adapted to contact the advancing edge of said moving sheet for moving at a like rate, a stop adjustable at points on the measuring post for engagement by the moving capping head to impart like motion to the post so as to undertake movement at the rate of the glass, a latch portion on each of said stop and head and engageable when same are brought together to latch the head in an upwardly suspended position, means operative after predetermined initial movement of said post which prevents relative vertical movement between the post and the carriage whereby the carriage is lifted due to the force of the moving sheet of glass on the head, cutter means on the cage movable across the cage to score the glass at the measured point for breaking off, and means to trip said latch portions and drop the suspended head when the scored sheet of glass has been broken away.

4. In a machine for making a transverse cut across a vertically moving sheet of glass, an upright measuring post for measuring the sheet at the point to be cut and arranged in assembly with a horizontal cutter carriage at the base thereof, said measuring post and said cutter carriage being guided for vertical movement alongside said sheet, a capping head mounted to travel freely between points on the post and adapted to contact the advancing edge of said moving sheet for moving at a like rate, an adjustable stop defining the upper point on the measuring post in the path of the capping head for engagement thereby to impart like motion to the post so as to undertake movement at the rate of the glass, said capping head carrying rollers for rolling vertically in both advanceable and retractive movement along said measuring post including a rolling part having an interengaged connection with a noncircular portion of the post so as to constitute the sole means to prevent turning of the head as it retractively rolls along said post, a latch portion on each of said stop and head and aligned to engage when same are brought together so as to latch the head in an upwardly suspended position, means operative after predetermined initial movement of said post which prevents further relative vertical movement between the post and the carriage whereby the carriage is lifted due to the force of the moving sheet of glass on the head, latch release means to trip the suspended head after it loses contact with the moving sheet of glass, and a bumper defining the lower point on said post in the path of the capping head so as to stop the descent thereof.

5. In a machine for making a transverse cut across a vertically moving sheet of glass, an upright measuring post for measuring off the location of the cut and arranged with a horizontal cutter carriage at the base thereof for making the cut, said measuring post and said cutter carriage being guided for vertical movement alongside said sheet, a capping head adapted to make disengageable contact with the advancing edge of said moving sheet and carrying rollers for rolling vertically along said measuring post including one rolling part having a positive meshing connection with a noncircular portion on the post to prevent turning of the head on its axis, said head further carrying an idler shaft connected to said one part to spin on its axis at a rate of rotation proportional to the travel of the head, an adjustable stop on the measuring post for engagement by the moving capping head to impart motion of the glass to the post so that it undertakes movement at a like rate, means operative after predetermined initial movement of said post which prevents further relative vertical movement between the post and carriage whereby the carriage is lifted due to the force of the moving sheet of glass on the head, a latch portion on each of said stop and head and engageable when same are brought together to latch the head in an upwardly suspended position after the sheet is broken away, and brake means on the head engaging said shaft to prevent uncontrolled descent of the head after the latch trips to drop the head from its suspended position.

6. In a machine adapted to make a transverse score at a measured point on a vertically moving sheet of glass, an assembly guided for vertical movement alongside said sheet comprising an upright measuring post and a horizontal cutter carriage at the base thereof for making the transverse cut at a measured point, a capping head having a rotatable portion which pivots into contact with the advancing edge of said moving sheet for moving at a like rate, said capping head carrying roller means for rolling vertically along said measuring post including a rolling member interengaged with a noncircular portion on the measuring post to prevent turning of the capping head on its axis, an adjustable stop on the measuring post for engagement by the moving capping head to impart like motion to the post so as to undertake movement at the rate of the glass, a latch between the stop and the head to suspend the latter when said portion is rotated out of contact with the glass and the sheet of glass is rotated and broken away, said head further carrying an idler shaft connected to said one rolling member to spin on its axis at a rate of rotation proportional to the axial travel of the head, and brake means effective when said latch is tripped to exert a restraining force on said shaft proportional to its rate of spinning in the capping head.

7. In a machine for making a transverse cut across a vertically moving sheet of glass, conveyor rolls for moving the sheet vertically, an upright measuring post for measurement of the sheet and arranged with a horizontal cutter carriage at the base thereof for making a transverse cut, a post supporting rod connected to move the upper end of the post in a guided vertical path alongside said sheet, said cutter carriage being guided for like vertical movement, a capping head mounted to travel freely between points on the post and adapted to contact the advancing edge of said moving sheet for moving at a like rate, means engageable after substantial movement of the head which prevents further relative movement between the head and the measuring post so that said post undertakes guided movement at a like rate, driving means comprising a clutch and connected to said conveyor rolls for moving said carriage at a slower rate compared to said glass, means operative after predetermined initial movement of said post for operating said clutch, and means operative after said carriage has begun said slower rate of movement which prevents further relative vertical movement between the post and the carriage whereby the carriage is lifted further due to the force of the moving sheet of glass on the head.

8. In a machine for making a transverse cut across a vertically moving sheet of glass, conveyor rolls for moving the sheet vertically, an upright measuring post to make a running measurement on the sheet and arranged with a horizontal cutter carriage at the base thereof for making the transverse cut, said cutter carriage being guided for vertical movement alongside said sheet, a post supporting rod connected to move the upper end of the post in a guided vertical path alongside said sheet, a capping head which is shiftably connected to and which for a major portion of its travel moves without the post and adapted to make disengageable contact with the advancing edge of said moving sheet for moving at a like rate both with and without the post prior to its final disengagement from the moving sheet, an adjustable stop on the measuring post with which the capping head makes latched engagement and by which it imparts like motion to the post so as to undertake movement at the rate of the glass, a lot motion connection between the base of the measuring post and said cutter carriage, driving means comprising a clutch and connected to said conveyor rolls for moving said carriage at a slower rate compared to said glass, means responsive to predetermined initial movement in said lost motion connection for operating said clutch, said lost motion connection thereafter engaging solidly to prevent further relative vertical movement between the post and the carriage whereby the carriage is lifted further due to the force of the moving sheet of glass on the head.

9. In a machine for making a transverse cut across a vertically moving sheet of glass, an upright measuring post to make a running measurement on the sheet and arranged with a horizontal cutter carriage at the base thereof for making the transverse cut, said measuring post and said cutter carriage being guided for vertical movement alongside said sheet, a capping head adapted to make disengageable contact with the advancing edge of said moving sheet for moving at a like rate prior to disengagement, said capping head carrying rollers for rolling lengthwise along the upright measuring post and including a toothed rolling member protruding into a slot on said post, a stop engageable by the capping head at the head of the measuring post and containing meshed adjusting gearing therefor including a toothed output member protruding into said slot on the post, said toothed members constituting the sole means preventing relative rotation between said stop and said head, aligned latch portions on each of said stop and said head engageable to prevent the separation thereof after the latched stop and the post undertake movement at the rate of the glass, and means operative after predetermined initial movement of said post which prevents further relative vertical movement between the post and the carriage whereby the carriage is lifted due to the force of the moving sheet of glass on the head.

10. In a machine for making a transverse cut across a vertically moving sheet of glass, an upright measuring post for measuring the sheet and arranged with a horizontal cutter carriage at the base thereof for making the transverse cut, said cutter carriage being guided for vertical movement alongside said sheet, a post supporting rod connected to move the upper end of the post in a guided vertical path alongside said sheet, a capping head carrying rollers for rolling lengthwise along the measuring post and including a toothed rolling member protruding into a slot on the post, a stop with which the capping head makes latched engagement at the head of the measuring post and containing meshed adjusting gearing including a toothed output member protruding into said slot on the post, said toothed members constituting the sole means preventing relative rotation between the stop and said head and engageable with a common set of rack teeth provided in said slot, said gearing in the stop including a pair of gears mounted for relative separation so as to unmesh enabling the stop to be freely adjustable independently of the adjusting gearing, said capping head adapted to project laterally into contact with the rising edge of said sheet so as to drag the stop and post therewith in like movement, and means operative after predetermined initial movement of said post which prevents further relative vertical movement between the post and the carriage whereby the carriage is lifted due to the force of the moving sheet of glass on the head.

11. In a machine for making a transverse cut across a vertically moving sheet of glass, conveyor rolls for moving the sheet vertically, an upright measuring post for measuring the sheet and arranged with a horizontal cutter carriage at the base thereof for making the cut, said cutter carriage being guided for vertical movement alongside said sheet, support means connected to the upper end of the post for guiding it in a vertical path alongside said sheet, a capping head mounted to travel freely between points on the post and having a portion pivoting into lateral contact with the rising edge of the sheet of glass for movement at a like rate, means on the post engageable by the capping head after substantial movement which prevents further relative movement between the head and the measuring post so that said post undertakes guided movement at a like rate, driving means comprising a clutch and connected to said conveyor rolls for moving said carriage at a slower rate than said glass, means operative after predetermined initial movement of said post for operating said clutch, means operative after said carriage has begun said slow rate of movement which prevents further relative vertical movement between the post and the carriage whereby the carriage is lifted further due to the force of the moving sheet of glass on the head, and automatic timer means for operating said clutch to automatically continue the upward movement of said cutter carriage for a set time period after said capping head portion has been withdrawn from contact with the glass.

12. In a machine for making a transverse score at a measured point on a vertically rising sheet of glass, an upright measuring post guided for vertical movement alongside said sheet, and cooperating elements which mutually engage but independently move lengthwise of the measuring post and at least one of which carries a friction-brake-connected member mounted to rotate on a fixed transverse axis thereof and riding in a guide slot in said post, the periphery of said rotatably mounted member cooperating with means in said slot to keep its running rate linearly of the slot commensurate with its peripheral turning rate while undergoing friction braking.

13. In a sheet glass cutting apparatus adapted to measure the sheet to a predetermined length for cutting, an upright measuring post guided for vertical movement alongside an upwardly moving sheet of glass and arranged with a horizontal cutter carriage at the base thereof to make a transverse cut across the measured length, a shiftable head element on the post and cooperating with an adjustably shiftable stop element thereon, and means establishing a cog drive between the post and a rotatably mounted shaft in each of said shiftable elements.

14. In a sheet glass cutting apparatus adapted to measure the sheet to a predetermined length for cutting, an upright measuring post guided for vertical movement alongside an upwardly moving sheet of glass, a traveling head element on the post and cooperating with an adjustably shiftable stop element thereon, means establishing a cog drive between the post and a rotatably mounted shaft in each of said elements, means operable to lock one of said shafts against rotation to lock the associated element in a shifted position, and means operable to restrain rotation of the other shaft for controlling the rate of shift of the associated element.

15. In a machine for making a transverse score at a measured point on a vertically rising sheet of glass, an upright measuring post guided for vertical movement alongside said sheet, a pair of elements which move lengthwise of the measuring post and at least one of which is adjusted to fixed positions thereon, a member mounted to said one element to rotate on a fixed transverse axis therein and riding in a guide slot in said post, a cog drive established by and between the periphery of said member and means disposed in said slot, and fixed and shiftable gearing members forming a normally constantly meshing gear train for accurately adjusting the position of said rotatable member and being shiftable to temporarily unmesh two gearing members in the train for free movement of said one element along said cog drive.

16. In a machine for making a transverse score at a measured point on a vertically rising sheet of glass, an upright measuring post guided for vertical movement alongside said sheet, cooperating elements which are mounted to move lengthwise of the measuring post and at least one of which has adjustable positions thereupon, and gear means for adjusting said one element on said measuring post comprising an output member constantly engaging means on the measuring post to establish a direct cog drive therewith, an input member disengageable from said gear means, and common means to pivot the input member from a disengaged position to a mutually meshed position with said gear means and to rotate said member in the latter position for adjusting the gear means.

17. In a glass cutting machine for automatically measuring the point at which a transverse score is to be made across a vertically rising sheet of glass, an upright measuring post guided for vertical movement alongside said sheet, fixed and movable elements on said post one of which moves so as to bump upwardly against the other and subsequently descend therefrom, and means for controlling the rate of movement of said one element comprising an idler shaft journaled therein, means including a toothed member establishing a direct cog drive connection between the post and the idler shaft so that the latter spins at a speed proportional to the running rate of the toothed member along the cog drive, and centrifugal brake means mounted to said element to prevent uncontrolled descent thereof and exerting a restraining torque on said shaft which increases with speed.

18. In a machine having a horizontal cutter carriage and a cutter movable thereacross for making a transverse score on a vertically rising sheet of glass, the combination of a fixed frame, a measuring post assembled in upstanding relationship to said carriage for raising the same and being supported and guided for vertical movement relative to said frame, a capping head mounted to travel up and down the measuring post and adapted to make disengageable contact with and be lifted by the advancing edge of said sheet, a stop on said post engageable by the capping head to drag the post and the carriage conjointly therewith at a rate equal to the rising sheet, a latch for retaining a hold between said head and stop when they are engaged so as to suspend the head from the latter after the head disengages from contact with the glass, and means operative after the scored sheet of glass has been broken away to trip said latch and drop the capping head from its suspended position.

19. In a machine having a horizontal cutter carriage and a cutter movable thereacross for making a transverse score on a vertically rising sheet of glass, the combination of a fixed frame to guide the carriage, a measuring post assembled in upstanding relationship to said carriage for raising the same in the frame, means including a guide rod supporting the upstanding end of the measuring post in a manner to materially counter the weight thereof, said guide rod being supported in vertical guides in the frame to guide the measuring post vertically, a capping head mounted to travel up and down the measuring post and adapted to make disengageable contact with and be lifted by the advancing edge of said sheet, a stop on said post engageable by the capping head to drag the post and the carriage conjointly therewith at the rate of the rising sheet, and a latch for retaining a hold between said head and stop when they are engaged so as to suspend the head from the latter when the head initially become disengaged from contact with the glass.

20. In a glass cutting machine for automatically measuring the point at which a transverse score is to be made across a vertically rising sheet of glass, conveyor rolls for moving the sheet vertically, an upright measuring post for measuring the sheet, a horizontal cutter carriage at the base of the measuring post for making the transverse cut, said measuring post and said cutter carriage being guided for vertical movement alongside said sheet, lost motion mechanism between the base of the measuring post and said cutter carriage through which the post operates to advance the carriage by transmitting the sustaining force of the moving glass and through which the post settles on the carriage when the force of movement is relinquished by the glass, further means to drive said carriage comprising a clutch and connected to said conveyor rolls for moving said carriage at a slower rate compared to said glass, a relay controlling switch in said lost motion mechanism for opening and for closing relay contacts in response to initially extending movement and part of the collapsing movement in said lost motion mechanism, said clutch having a control circuit including said relay contacts for engaging and disengaging the clutch and operative to engage said clutch immediately the switch in said mechanism senses initial movement thereof, and further including automatic timer means to temporarily delay said relay contacts from opening immediately said switch senses that the force of moving the cutter carriage has been relinquished by the sheet of glass.

21. In a glass cutting machine for automatically measuring the point at which a transverse cut across the vertically moving sheet of glass is to be made, conveyor rolls for moving the sheet vertically, an assembly formed of an upright measuring post for measuring the sheet and a horizontal cutter carriage at the base thereof for making the cut, said assembly being guided for vertical movement alongside said sheet, a capping head having a laterally advanceable portion to make contact with the advancing edge of said moving sheet and riding upwardly on the post at the rate of the sheet, driving means comprising a magnetically operated clutch and connected to said conveyor rolls for moving said carriage at a slower rate than said glass, a stop on said post adjusted for engagement by said capping head to impart like motion to the post so as to undertake movement at the rate of the glass, a latch portion on each of said stop and head and engageable when the parts are brought together to latch the head in an upwardly suspended position, and first and second means acting in sequence first to latch said head to said stop and energize and engage said magnetic clutch and second to retain said latching and to continue upward movement of said carriage after said capping head has been withdrawn, said second means being deactivated to substantially simultaneously disengage said latch and disengage said magnetic clutch by deenergizing the same.

22. In a machine for making a transverse score at a measured point on a vertically rising sheet of glass and including first and second movable means, said first means comprising glass end location responsive contact means and said second means comprising stop means in the path of travel of said contact means: the combination with one of said means, of an upstanding measuring post structure to receive same, support means operatively engaged with said measuring post to guide it for vertical movement alongside said sheet, said one means and said measuring post structure having complementary inner and outer peripheries engaged in complete encirclement one within the other, said complementary peripheries being relatively relieved in a longitudinally extending direction in the face portion thereof, a fixed rule in a relatively relieved portion of said peripheries by which to accurately preset a glass measurement due to the proper positioning of said one means relative to a desired point on said post structure, a toothed member in a relatively relieved portion of said peripheries engageable with a companion member operatively fixed to rotate in the plane of said toothed member and journalled within said one means to establish a cog drive therebetween, a quick-release connection for latching the first and second means together at the desired point of the said one means, and actuating means operatively connected to trip said quick-release connection for immediately releasing the first and second means from one another.

23. The combination according to claim 22 and further including means comprising a guide rod supported to pull on the upstanding end of the measuring post structure to materially counter the weight of the latter.

24. The combination of claim 22 further including a guide assembly adjacent the upstanding end of said post structure comprising a guided chain which is looped between its end portions, a counterweight secured to one of said end portions, a guide rod guided in a direction in a plane common to the counterweight and to the chain and secured at its rear to an end portion of the latter, and means connecting the guide rod to counter the weight of the post structure from above and effective to hold the upstanding end of the latter in a frontwardly offset position in the centrally located, common vertical plane of the counterweight, the guided chain, and the guide rod so as to prevent the post structure from tendency toward twisting on its axis.

25. The combination of claim 22 wherein said post structure is essentially circular in cross section with the relieved portions aforesaid formed in the surface thereof and wherein said one means carries hour-glass shaped rollers arranged for rolling along opposite sides of said essentially circular post structure without interference from said relieved portions.

26. In a machine for making a transverse score at a measured point on a vertically rising sheet of glass, an upright measuring post, support means operatively engaged with said measuring post to guide it for vertical movement alongside said sheet, first and second vertically spaced-apart elements carried by said post for independent movement in a lengthwise direction with respect thereto and independently relative to one another, a member mounted to rotate on a fixed transverse axis on one of said elements and riding in a guide slot in said post so as to constitute the sole means preventing the above-named one of said elements from movement about the axis of the post when moving axially therealong in said lengthwise direction of movement, a quick-release connection which is effective between the elements and which when tripped accommodates the elements in separating for their independent relative movement as aforesaid, means securing the uppermost element on said post at a preselected location of said element in which it supports the other of the elements when they are connected, and actuating means operatively connected for tripping the quick-release connection to immediately release said other element.

27. For use in a machine for making a transverse score at a measured point on a vertically rising sheet of glass, upright measuring post structure adapted for vertical movement alongside said sheet, said structure including cooperating elements each of which is mounted to move lengthwise of the measuring post and at least one of which has adjustable positions thereupon, gear means for adjusting the above-named one of said elements on said measuring post comprising an output member constantly engaging means on the measuring post to establish a direct cog drive therewith, a manually operable input member, constantly biased means to pivot said input member into engagement with said gear means, said input member being temporarily manually disengageable from the gear means against the urging of the last said biased means enabling first a coarse approximation and then fine adjustment of the above-named one of said elements to a selected location on said measuring post, a quick-release connection for latching said elements together so that at said selected location said one element holds the other in a suspended position, and actuating means operatively connected for tripping said quick-release connection to drop the other element from its suspended position.

References Cited in the file of this patent

UNITED STATES PATENTS

| | | |
|---|---|---|
| 2,076,246 | Nelson | Apr. 6, 1937 |
| 2,323,686 | Sommerfeld | July 6, 1943 |
| 2,521,934 | Mitchell | Sept. 12, 1950 |
| 2,559,533 | Daniels | July 3, 1951 |
| 2,650,430 | Klages | Sept. 1, 1953 |

UNITED STATES PATENT OFFICE
CERTIFICATION OF CORRECTION

Patent No. 3,003,242                                                  October 10, 1961

Thomas A. Insolio

It is hereby certified that error appears in the above numbered patent requiring correction and that the said Letters Patent should read as corrected below.

Column 1, line 29, after "cage" insert -- lift --; line 34, for "legnthwise" read -- lengthwise --; column 4, line 1, for "that" read -- than --; column 13, line 41, for "lot" read -- lost --; column 16, line 24, for "become" read -- becomes --.

Signed and sealed this 3rd day of April 1962.

(SEAL)
Attest:

ERNEST W. SWIDER                                            DAVID L. LADD
Attesting Officer                                                Commissioner of Patents